US011961426B2

(12) United States Patent
Zou

(10) Patent No.: US 11,961,426 B2
(45) Date of Patent: Apr. 16, 2024

(54) DISPLAY SCREEN SPLICING DEVICE AND SPLICED DISPLAY DEVICE

(71) Applicant: TCL CHINA STAR OPTOELECTRONICS TECHNOLOGY CO., LTD., Shenzhen (CN)

(72) Inventor: Guangnan Zou, Shenzhen (CN)

(73) Assignee: TCL CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 377 days.

(21) Appl. No.: 17/600,277

(22) PCT Filed: Aug. 30, 2021

(86) PCT No.: PCT/CN2021/115207

§ 371 (c)(1),
(2) Date: Sep. 30, 2021

(87) PCT Pub. No.: WO2023/004916

PCT Pub. Date: Feb. 2, 2023

(65) Prior Publication Data

US 2023/0206787 A1 Jun. 29, 2023

(30) Foreign Application Priority Data

Jul. 29, 2021 (CN) ......................... 202110862026.7

(51) Int. Cl.
*G09F 9/302* (2006.01)

(52) U.S. Cl.
CPC .................................. *G09F 9/3026* (2013.01)

(58) Field of Classification Search
CPC .. H05K 5/0017; H05K 5/0021; H05K 5/0204; H05K 5/0221; H05K 5/0247;
(Continued)

(56) References Cited

U.S. PATENT DOCUMENTS 9,151,060 B2 * 10/2015 Khongbantabam .......................... E04F 13/0894
9,864,561 B2 * 1/2018 Hochman .............. H01R 25/00
(Continued)

FOREIGN PATENT DOCUMENTS

CN 204348272 U 5/2015
CN 207651098 U 7/2018
(Continued)

*Primary Examiner* — Abhishek M Rathod
(74) *Attorney, Agent, or Firm* — The Roy Gross Law Firm, LLC; Roy Gross

(57) ABSTRACT

The present disclosure provides a display screen splicing device and a spliced display device. The display screen splicing device includes a substrate, at least two carrier plates, and a position adjustment assembly. The carrier plates are disposed on the substrate. The position adjustment assembly is connected between the substrate and the carrier plates. The position adjustment assembly includes a first adjustment member disposed on the substrate, and a second adjustment member movably connected to the first adjustment member. The second adjustment member is fixedly connected to the carrier plates. A movement track of the second adjustment member is parallel to a plane where the carrier plates are located.

16 Claims, 8 Drawing Sheets

(58) Field of Classification Search
CPC ........... H05K 5/03; G09F 9/3026; G09F 9/33; G09F 9/302; G09F 9/3023; G06F 3/1446; G06F 3/147; G06F 1/1601; G06F 1/1607; G06F 1/1647; G06F 1/1652
See application file for complete search history.

(56) References Cited

U.S. PATENT DOCUMENTS

| | | | | |
|---|---|---|---|---|
| 10,653,021 B2 * | 5/2020 | Kim | G09F 9/3026 | |
| 10,660,225 B2 * | 5/2020 | Schafer | H05K 5/0017 | |
| 10,948,126 B2 * | 3/2021 | Ootsuka | B23Q 1/0045 | |
| 11,251,333 B2 * | 2/2022 | Kim | G09F 9/3026 | |
| 2011/0001025 A1 * | 1/2011 | Fiedler | H01F 7/0242 | 248/206.5 |
| 2014/0375529 A1 * | 12/2014 | Yun | G06F 1/1652 | 345/1.3 |
| 2019/0179592 A1 * | 6/2019 | Hyeon | G09G 3/006 | |
| 2019/0196773 A1 * | 6/2019 | Miles | G06F 3/1446 | |
| 2019/0327843 A1 * | 10/2019 | Chang | H05K 5/0247 | |
| 2020/0068726 A1 * | 2/2020 | Hwang | H05K 5/0221 | |
| 2020/0194539 A1 * | 6/2020 | Kim | H10K 50/84 | |
| 2020/0196462 A1 * | 6/2020 | Kim | H05K 5/03 | |
| 2021/0050486 A1 | 2/2021 | Li et al. | | |

FOREIGN PATENT DOCUMENTS

| | | |
|---|---|---|
| CN | 110307451 A | 10/2019 |
| CN | 110992848 A | 4/2020 |
| CN | 210722234 U | 6/2020 |
| CN | 111402748 A | 7/2020 |

* cited by examiner

DISPLAY SCREEN SPLICING DEVICE AND SPLICED DISPLAY DEVICE

CROSS REFERENCE TO RELATED APPLICATIONS

This application is a National Phase of PCT Patent Application No. PCT/CN2021/115207 having International filing date of Aug. 30, 2021, which claims the benefit of priority of Chinese Application No. 202110862026.7 filed on Jul. 29, 2021. The contents of the above applications are all incorporated by reference as if fully set forth herein in their entirety.

FIELD OF INVENTION

The present disclosure relates to display technologies, and more particularly, to a display screen splicing device and a spliced display device.

BACKGROUND OF INVENTION

With the enhancement of monitoring technologies and data collection abilities, whether a display terminal can timely and accurately present collected data relates directly to rationality of decisions of superior departments. In order to satisfy market requirements, a seamlessly spliced high-definition display screen emerges. Seamless splicing technologies can improve a screen resolution, guarantee picture quality, and satisfy requirements of users when watching at a small distance. However, the conventional splicing technologies fail to avoid splicing seams caused by position differences between adjacent display screens.

SUMMARY OF INVENTION

In view of the above, the present disclosure provides a display screen splicing device and a spliced display device that can achieve smaller splicing seams.

The present disclosure provides a display screen splicing device. The display screen splicing device includes:

a substrate;

at least two carrier plates, each disposed on the substrate and configured to carry a display screen; and a position adjustment assembly, connected between the substrate and the carrier plates, wherein the position adjustment assembly includes a first adjustment member and a second adjustment member, the first adjustment member is disposed on the substrate, the second adjustment member is movably connected to the first adjustment member and is fixedly connected to the carrier plates, and a movement track of the second adjustment member is parallel to a plane where the carrier plates are located.

In an embodiment, a via is provided on the substrate and includes a first sub-via. A first adjustment member is disposed in the first sub-via. At least part of a second adjustment member is disposed in the first sub-via. A movement gap is retained between the second adjustment member and a sidewall of the first sub-via.

In an embodiment, a buffer layer is disposed on the sidewall of the first sub-via.

In an embodiment, the first adjustment member and the second adjustment member each are a magnet.

In an embodiment, the position adjustment assembly further includes a third adjustment member. The third adjustment member is fixedly connected to an end of the first adjustment member that is away from the second adjustment member. The via includes a second sub-via. The second sub-via communicates with the first sub-via. The third adjustment member is disposed in the second sub-via. A movement track of the third adjustment member is perpendicular to the plane where the carrier plates are located.

In an embodiment, a limiting portion is disposed in the second sub-via. A threaded hole is provided in the limiting portion. The third adjustment member includes a threaded member. The threaded member is threaded through the threaded hole and is threadedly connected to the threaded hole.

In an embodiment, the third adjustment member further includes a connecting member. An end portion of the threaded member is fixedly connected to the connecting member. The first adjustment member is fixedly connected to an end of the connecting member that is away from the threaded member.

In an embodiment, the connecting member is disposed in the second sub-via. A guiding rail is disposed on a hole wall of the second sub-via. A guiding groove is provided on a peripheral surface of the connecting member, and the guiding rail is disposed in the guiding groove.

In an embodiment, the connecting member is a metallic block.

The present disclosure further provides a spliced display device. The spliced display device includes the display screen splicing device and the display screen described above. The display screen is disposed on sides of the carrier plates that are away from the substrate.

The present disclosure further provides a display screen splicing device. The display screen splicing device includes:

a substrate;

at least two carrier plates, each disposed on the substrate and configured to carry a display screen; and a position adjustment assembly, connected between the substrate and the carrier plates, wherein the position adjustment assembly includes a first adjustment member, a second adjustment member, and a third adjustment member, the first adjustment member is disposed on the substrate, the second adjustment member is movably connected to the first adjustment member and is fixedly connected to the carrier plates, a movement track of the second adjustment member is parallel to a plane where the carrier plates are located, the third adjustment member is fixedly connected to an end of the first adjustment member that is away from the second adjustment member, and a movement track of the third adjustment member is perpendicular to the plane where the carrier plates are located.

The present disclosure provides a display screen splicing device and a spliced display device. According to the display screen splicing device of the present disclosure, the first adjustment member and the second adjustment member are disposed between the substrate and the carrier plates. When the display screen is disposed on the carrier plate, the second adjustment member is caused to move relative to the first adjustment member in a direction parallel to a plane where the carrier plate is located, so that the carrier plate and the display screen can be driven to move, thereby adjusting positions of a plurality of display screens. In this way, physical splicing seams among the plurality of display screens are reduced or even eliminated, thereby obtaining a spliced display device has smaller splicing seams or a seamless spliced display device.

BRIEF DESCRIPTION OF DRAWINGS

To describe the technical solutions in the present disclosure more clearly, the following briefly describes the accompanying drawings required for describing the implementations. Apparently, the accompanying drawings in the following description show merely some embodiments of the present disclosure, and a person skilled in the art may still derive other drawings according to these accompanying drawings without creative efforts.

DETAILED DESCRIPTION OF PREFERRED EMBODIMENTS

Figure 1:
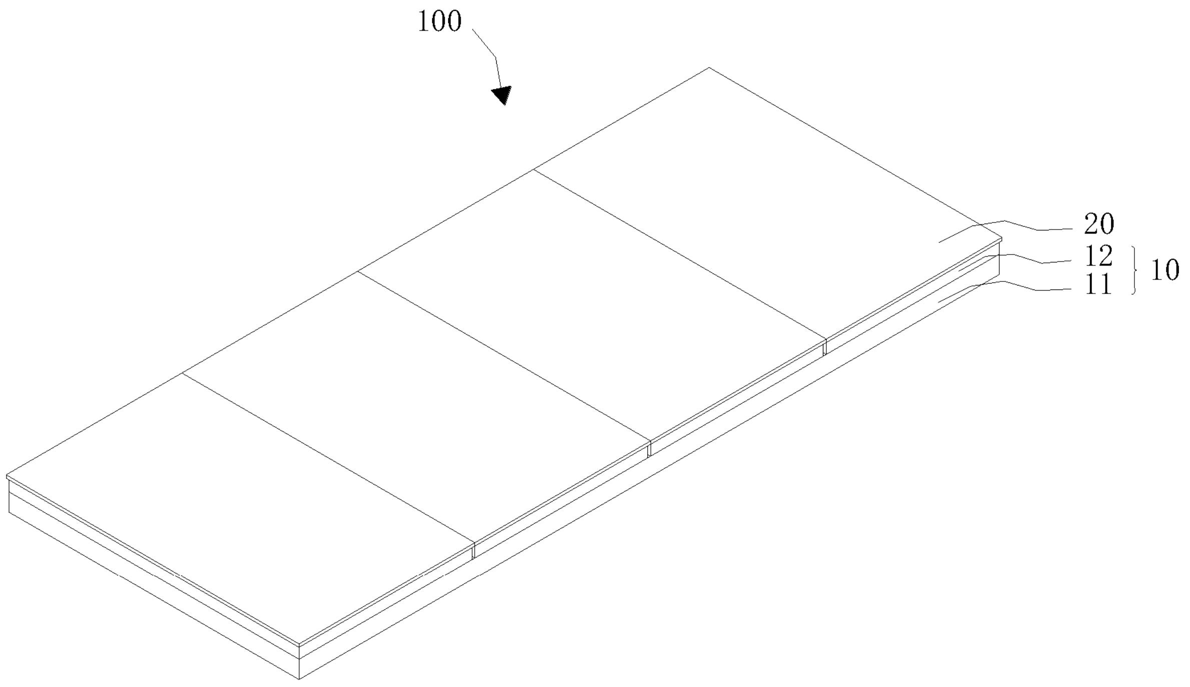
FIG. 1 is a three-dimensional schematic diagram of a spliced display device according to the present disclosure.
Figure 2:
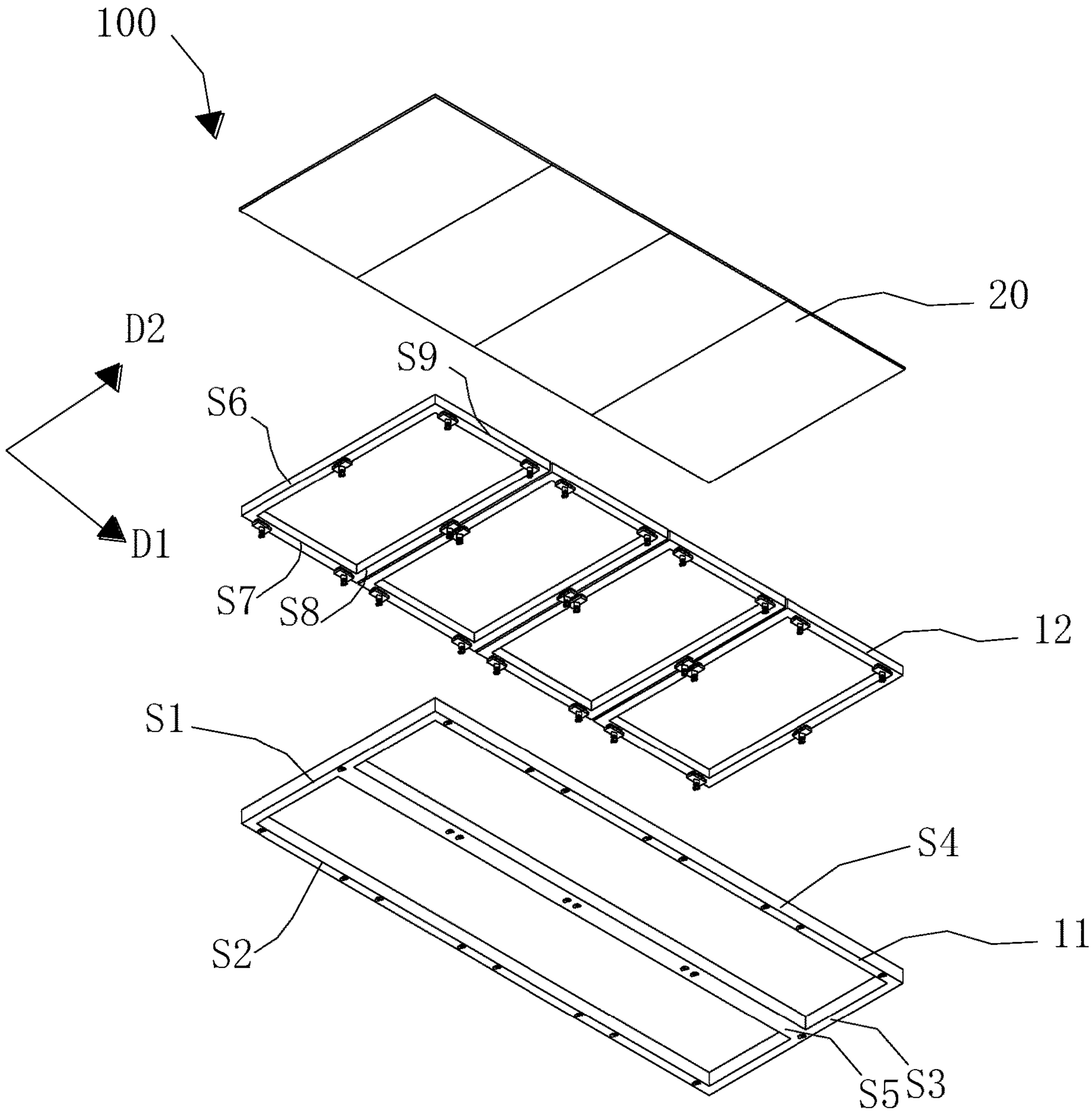
FIG. 2 is a three-dimensional exploded view of the spliced display device in FIG. 1 from an angle.
Figure 3:
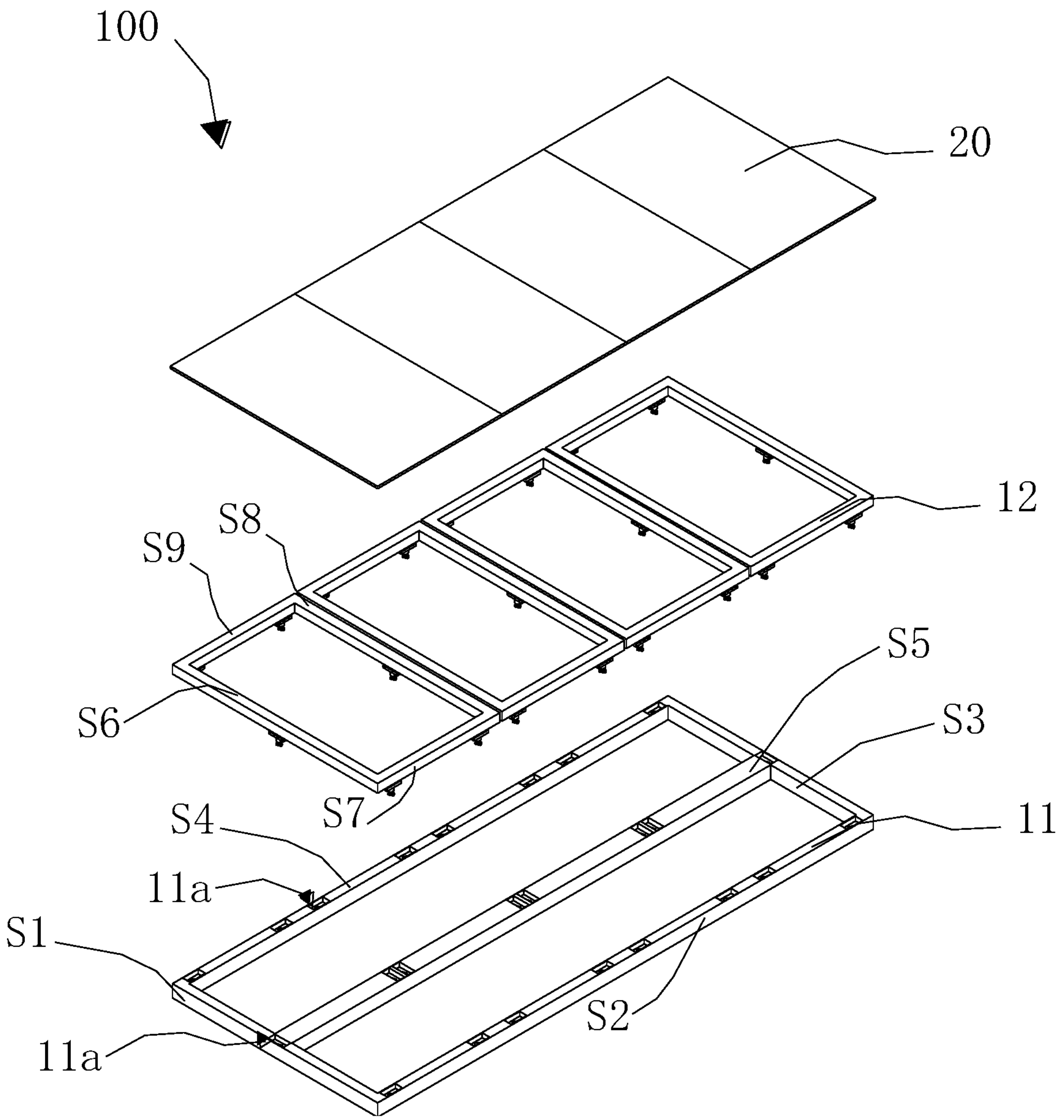
FIG. 3 is a three-dimensional exploded view of the spliced display device in FIG. 1 from another angle.
Figure 4:
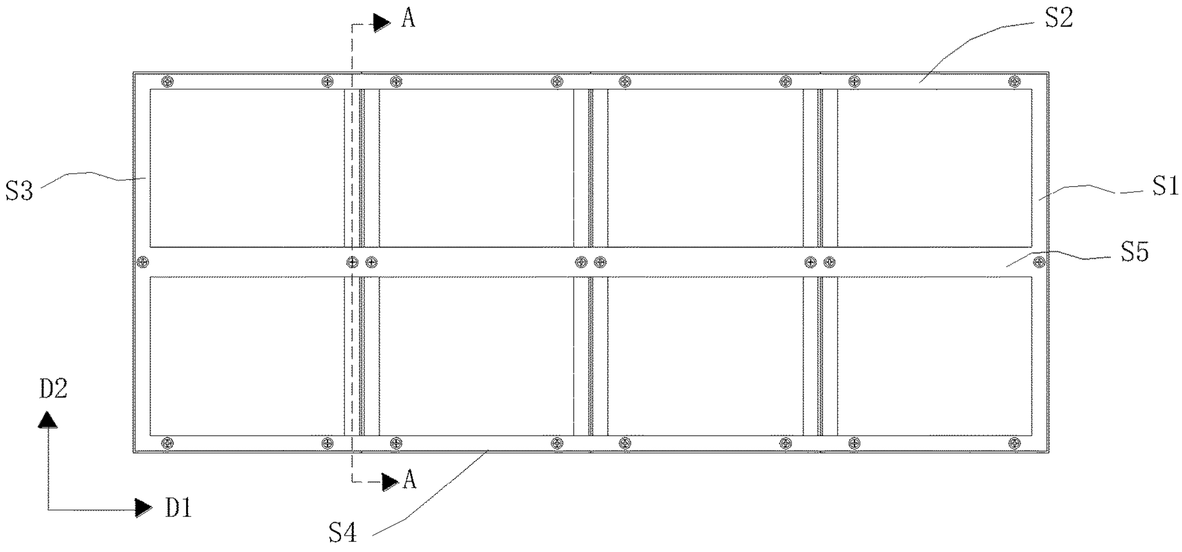
FIG. 4 is a schematic diagram of a back side of the spliced display device in FIG. 1.

Technical solutions in the embodiments of the present disclosure are clearly and completely described below with reference to the accompanying drawings in the embodiments of the present disclosure. Apparently, the described implementations are merely some embodiments rather than all the embodiments of the present disclosure. All other implementations obtained by a person skilled in the art based on the implementations of the present disclosure without creative efforts shall fall within the protection scope of the present disclosure.

In the present disclosure, unless otherwise explicitly stipulated and defined, that a first feature is “above” or “under” a second feature may include that the first and second features are in direct contact, or may include that the first and second features are not in direct contact but in contact by using other features therebetween. In addition, that the first feature is “above”, “over”, or “on” the second feature may include that the first feature is directly above and obliquely above the second feature, or may merely indicate that the horizontal height of the first feature is higher than that of the second feature. That the first feature is “below”, “under”, and “beneath” the second feature may include that the first feature is right below the second feature and at an inclined bottom of the second feature, or may merely indicate that the horizontal position of the first feature is lower than that of the second feature.

Referring to FIGS. 1 to 4, a spliced display device 100 of the present disclosure may be a liquid crystal display (LCD), an organic light-emitting diode (OLED) display, a micro-LED display, or a mini-LED display.

The spliced display device 100 includes a display screen splicing device 10 and at least two display screens 20 disposed on the display screen splicing device 10. The display screen splicing device 10 includes a substrate 11*a* nd at least two carrier plates 12. Each carrier plate 12 is configured to carry each display screen 20. In detail, the display screens 20 and the carrier plates 12 are in a one-to-one correspondence. One display screen 20 is disposed on one carrier plate 12, and is then disposed on the substrate 11*a* long with the carrier plate 12. The plurality of display screens 20 may be arranged on the substrate 11 close to each other in a first direction D1, or may be arranged on the substrate 11 close to each other in a second direction D2, or may be arranged in an array on the substrate 11, that is to say, the display screens are arranged on the substrate 11 close to each other in the first direction D1 and in the second direction D2. The first direction D1 and the second direction D2 are perpendicular to each other. When the spliced display device 100 is disposed perpendicularly to the ground, the first direction D1 may be a horizontal direction, and the second direction D2 may be a vertical direction. When the spliced display device 100 is disposed parallel to the ground, the first direction D1 and the second direction D2 are both parallel to the ground.

The display screen 20 may be fixedly connected to the carrier plate 12. Optionally, the display screen 20 may be bonded on the carrier plate 12 by using a double-faced adhesive tape, or may be fixed to the carrier plate 12 in other manners. Further, the display screen 20 is detachably connected to the carrier plate 12. When the display screen 20 in the spliced display device 100 fails, the faulty display screen 20 may be replaced merely by disassembling the corresponding carrier plate 12. Therefore, mounting and disassembling are convenient.

The substrate 11 is configured to fix and support the carrier plate 12 and the display screen 20. In the present embodiment, the substrate 11 is in a hollowed-out rectangular shape. In detail, the substrate 11 includes a first side S1, a second side S2, a third side S3, a fourth side S4, and a fifth side S5. The first side S1 and the third side S3 are disposed opposite and parallel to each other. The second side S2 and the fourth side S4 are disposed opposite and parallel to each other. The second side S2 and the fourth side S4 each are connected between the first side S1 and the third side S3. The fifth side S5 is disposed parallel to the second side S2, is located between the second side S2 and the fourth side S4, and is connected between the first side S1 and the third side S3. In the present embodiment, the at least two display screens 20 are arranged in the first direction D1. The first side S1 and the third side S3 extend in the second direction D2. The second side S2, the fourth side S4, and the fifth side S5 extends in the first direction D1. The fifth side S5 can help the substrate 11 fix the carrier plate 12 and the display screen 20 more firmly, so as to stabilize the display screen 20 more effectively. It is to be understood that, in other embodiments of the present disclosure, the substrate 11 may not include the fifth side S5.

A plurality of vias 11*a* are provided in the substrate 11. The plurality of vias 11*a* are spaced apart on the second side S2, the fourth side S4, and the fifth side S5. Corresponding to one display screen 20, the second side S2, the fourth side S4, and the fifth side S5 each are provided with two vias 11*a*. The two vias 11*a* on each side respectively correspond to two ends of one display screen 20. Two ends of the second side S2, the fourth side S4, and the fifth side S5 in the direction in which the display screens 20 are arranged, that is, the first direction D1 each are provided with one via 11*a*. Between the vias 11*a* on the two ends of each of the second side S2, the fourth side S4, and the fifth side S5, a plurality of vias 11*a* are adjacently arranged in pairs, and are configured to dispose two adjacent display screens 20.

It is to be understand that, in the present disclosure, a shape of the substrate 11 is not limited. The shape of the substrate 11 may vary depending on a shape of the display screen 20. Assuming that the display screen 20 is a special-shaped display screen 20, the shape of the substrate 11 may be designed as a shape matching the shape of the special-shaped display screen 20. In the present disclosure, a material of the substrate 11 is also not limited. In order to reduce a weight of the spliced display device 100, the material of the substrate 11 may be metal, such as aluminum alloy. In the present disclosure, a quantity of the vias 11*a* is also not limited, as long as the display screen 20 corresponds to at least one via 11*a*.

The carrier plate 12 is configured to connect the display screen 20 to the substrate 11. A shape of the carrier plate 12 is substantially the same as the shapes of the substrate 11*a* nd the display screen 20. Optionally, the carrier plate 12 and the display screen 20 have a same shape. An area of the carrier plate 12 is slightly less than an area of the display screen 20. In this way, when the display screen 20 covers the carrier plate 12, a user can see only the display screen 20 but not the carrier plate 12 under the display screen 20, and the display screen 20 can be conveniently spliced seamlessly. The carrier plate 12 may be in a hollowed-out rectangular shape. The carrier plate 12 includes a sixth side S6, a seventh side S7, an eighth side S8, and a ninth side S9. The sixth side S6, the seventh side S7, the eighth side S8, and the ninth side S9 are in a one-to-one correspondence with the first side S1, the second side S2, the third side S3, and the fourth side S4, and may be detachably connected. In addition, in the present disclosure, a material of the carrier plate 12 is also not limited. The material of the carrier plate 12 may be metal. Metal has a desirable heat dissipation characteristic, which can facilitate heat dissipation of the display screen 20. Therefore, the service life of the display screen 20 can be prolonged.

The display screen splicing device 10 further includes a plurality of position adjustment assemblies 13. The position adjustment assemblies 13 are connected between the substrate 11*a* nd the carrier plates 12. In detail, part of the position adjustment assemblies 13 may be mounted to the carrier plate 12, and at least part of the position adjustment assemblies is disposed in the vias 11*a* of the substrate 11. Each display screen 20 corresponds to six position adjustment assemblies 13. The six position adjustment assemblies 13 are respectively disposed corresponding to six vias 11*a* on the substrate 11. In detail, one position adjustment assembly 13 is disposed in the middle of each of the sixth side S6 and the eighth side S8. One position adjustment assembly 13 is disposed on each of two ends of each of the seventh side S7 and the ninth side S9 in the first direction D1.

Figure 5:
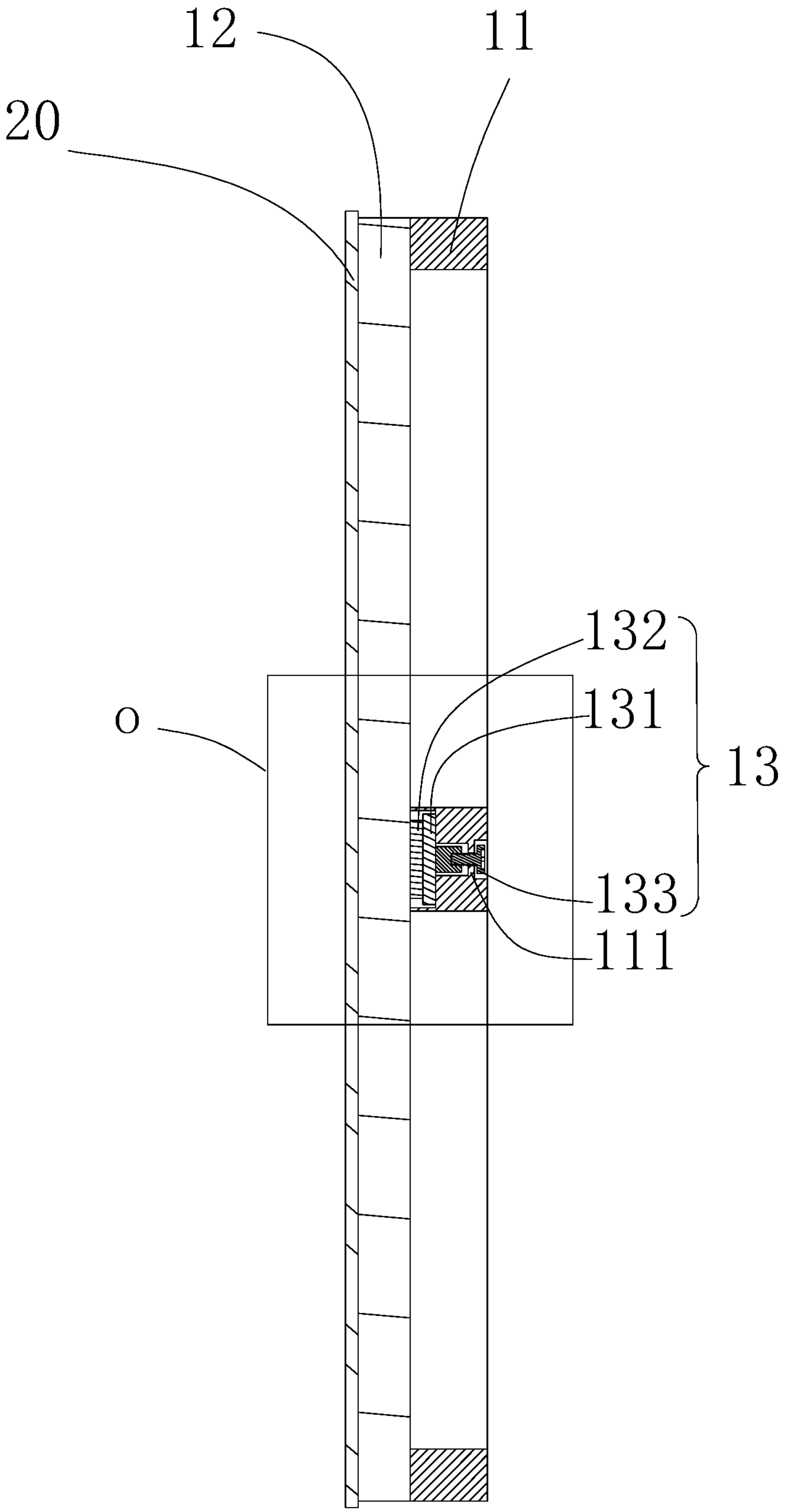
FIG. 5 is a partial cross-sectional view of the spliced display device in FIG. 4 taken along line A-A.
Figure 6:
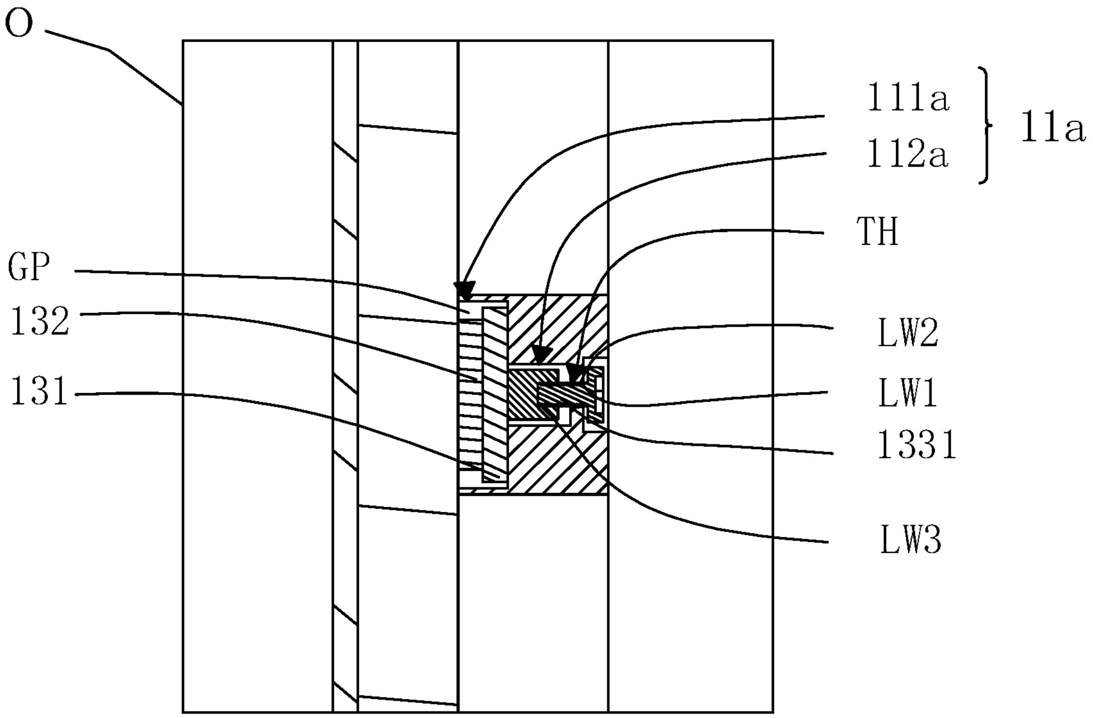
FIG. 6 is a partial enlarged diagram of a portion O in FIG. 5.

Referring to FIGS. 5 and 6, each position adjustment assembly 13 includes a first adjustment member 131 and a second adjustment member 132. The first adjustment member 131 is disposed on the substrate 11. The second adjustment member 132 is movably connected to the first adjustment member 131, and is fixedly connected to each carrier plate 12. The second adjustment member 132 is movable relative to the first adjustment member 131 in the direction parallel to a plane where the carrier plate 12 is located. It is to be noted that, in this specification, the plane where the carrier plate 12 is located is a plane coplanar with a back side (facing a surface of the substrate 11) of the carrier plate 12. In more detail, the second adjustment member 132 is slidable on a surface of the first adjustment member 131. Thus, the display screen 20 is driven to move in the direction parallel to the plane where the carrier plate 12 is located. That is to say, a movement track of the second adjustment member 132 relative to the first adjustment member 131 is parallel to the plane where the carrier plate 12 is located.

Optionally, the first adjustment member 131 may be fixed in the direction parallel to the plane where the carrier plate 12 is located. It is to be noted that, the expression "the first adjustment member 131 is fixed in the direction parallel to the plane where the carrier plate 12 is located" means that the first adjustment member 131 is unmovable in the direction parallel to the plane where the carrier plate 12 is located. Optionally, the first adjustment member 131 is also movable in the direction parallel to the plane where the carrier plate 12 is located. When the second adjustment member 132 is moved relative to the first adjustment member 131, the first adjustment member 131 is locked in the direction parallel to the plane where the carrier plate 12 is located. The first adjustment member 131 may be disposed in the via 11*a*. In other implementations of present disclosure, the substrate 11 may have no via 11*a* provided therein. The first adjustment member 131 may be movably connected to other positions on the substrate 11 using a connecting member, for example, connected to any of the first side S1 to the fifth side S5 of the substrate 11.

At least part of the second adjustment member 132 may be disposed in the via 11*a*. A movement gap GP is retained between the second adjustment member 132 and a sidewall of a first sub-via 111*a* for the second adjustment member 132 to move. It is to be understood that, the second adjustment member 132 may also be located outside the via 11*a* and exposed between the carrier plate 12 and the substrate 11. In this case, the movement of the second adjustment member is not limited by the via 11*a*.

Further, each via 11*a* includes a first sub-via 111*a*. The first adjustment member 131 and the second adjustment member 132 are disposed in the first sub-via 111*a*. The first sub-via 111*a* may be columnar, for example, cylindrical or a prismatic. Areas of the first sub-vias 111*a* perpendicular to the plane where the carrier plate 12 is located are the same. In detail, the first sub-via 111*a* may be a cube. The first adjustment member 131 and the second adjustment member 132 each are also a cube. An area of the second adjustment member 132 parallel to a surface of the carrier plate 12 is less than an area of the first adjustment member 131 parallel to the surface of the carrier plate 12. A gap is retained between the first adjustment member 131 and a sidewall of the first sub-via 111*a* to facilitate mounting. Optionally, a side face of the first adjustment member 131 may also be precisely connected to a sidewall of the first sub-via 111*a* that is opposite to the side face, so as to fix the first adjustment member 131 in the first sub-via 111*a* in the direction parallel to the plane where the carrier plate 12 is located. In another structure, the area of the first adjustment member 131 parallel to the surface of the carrier plate 12 equals to the area of the second adjustment member 132 parallel to the surface of the carrier plate 12. However, an area of an accommodating cavity in the first sub-via 111*a* that is used for accommodating the first adjustment member 131 parallel to the plane where the carrier plate 12 is located is greater than an area of an accommodating cavity for accommodating the second adjustment member 132 parallel to the plane where the carrier plate 12 is located. Therefore, the second adjustment member 132 is movable in the direction parallel to the plane where the carrier plate 12 is located.

Optionally, in order to achieve more stable movement, the first adjustment member 131 and the second adjustment member 132 each are designed as a magnet. In this way, the first adjustment member 131 and the second adjustment member 132 may be connected to each other by means of mutual attraction. Therefore, no additional connecting structure is required between the first adjustment member 131 and the second adjustment member 132. The first adjustment member 131 and the second adjustment member 132 may also selectively be other members capable of relative movement. For example, the first adjustment member 131 may be a sliding rail, and the second adjustment member 132 may be a slider mated with the sliding rail.

The position adjustment assembly 13 further includes a third adjustment member 133. The third adjustment member 133 is configured to cause the display screen 20 and the carrier plate 12 to move in the direction perpendicular to the plane where the carrier plate 12 is located. The third adjustment member 133 is connected to an end of the first adjustment member 131 that is away from the second adjustment member 132. Specifically, the via 11*a* further includes a second sub-via 112*a*. The second sub-via 112*a* communicates with the first sub-via 111*a*. The third adjustment member 133 is disposed in the second sub-via 112*a*. Optionally, an opening area of the first sub-via 111*a* is greater than an opening area of the second sub-via 112*a*, to form a step portion between the second sub-via 112*a* and the first sub-via 111*a*. The step portion can limit a range of movement of the first adjustment member 131 in the direction perpendicular to the plane where the carrier plate 12 is located, so that the first adjustment member 131 is movable forward and backward in only the first sub-via 111*a* without falling into the second sub-via 112*a*.

A limiting portion 111 is disposed in the second sub-via 112*a*. The limiting portion 111 is a baffle disposed in the second sub-via 112*a*. The baffle is connected to the sidewall of the sub-via. The baffle may be parallel to the plane where the carrier plate 12 is located. A threaded hole TH is provided in the limiting portion 111. The third adjustment member 133 is threaded through the threaded hole TH. The third adjustment member 133 is movable relative to the limiting portion 111 in the direction perpendicular to the plane where the carrier plate 12 is located. That is to say, a movement track of the third adjustment member 133 is perpendicular to the plane where the carrier plate 12 is located. In detail, the third adjustment member 133 includes a threaded member 1331. A first thread LW1 is disposed on the threaded member 1331. A second thread LW2 mated with the first thread LW1 is disposed on an inner wall of the threaded hole TH. The first thread LW1 and the second thread LW2 both extend in the direction perpendicular to the plane where the carrier plate 12 is located. By means of the first thread LW1 and the second thread LW2 mated with each other, the third adjustment member 133 is limited in the limiting portion 111. The third adjustment member 133 is rotatable forward or backward in the threaded hole TH of the limiting portion 111, so as to drive the carrier plate 12 and the display screen 20 to move. In addition, the third adjustment member 133 is fixed in the direction parallel to the plane where the carrier plate 12 is located by using the limiting portion 111, so that the first adjustment member 131 fixedly connected to the third adjustment member 133 can be fixed in the direction parallel to the plane where the carrier plate 12 is located.

It is to be understood that, an implementation of the third adjustment member 133 is not limited to the threaded member 1331, and the limiting portion 111 is also not limited to the baffle, as long as the third adjustment member 133 is movable forward and backward in the limiting portion 111. For example, the third adjustment member 133 may also be a slider, and the limiting portion 111 may also be designed as a sliding groove mated with the slider. The slider may slide in the sliding groove under the action of an external force, and may be locked at a fixed position in the sliding groove using a locking member.

When the first adjustment member 131 is a magnet and the third adjustment member 133 includes the threaded member 1331, it is difficult to process a thread on the magnet. In this case, the threaded member 1331 may be connected to the first adjustment member 131 busing a connecting member 134. In detail, the connecting member 134 may be disposed in the second sub-via 112*a* and located between the limiting portion 111*a* nd the first adjustment member 131. An end portion of the threaded member 1331 is fixedly connected to the connecting member 134. The first adjustment member 131 is fixedly connected to an end of the connecting member 134 that is away from the threaded member 1331.

Optionally, a third thread LW3 mated with the first thread LW1 is disposed in the connecting member 134. The threaded member 1331 is snapped into a bottom of the third thread LW3. After the connecting member 134 is connected to the threaded member 1331, in a usage state, the first thread LW1 is snugly snap-fitted with the third thread LW3, and the connecting member 134 and the threaded member 1331 are fixed as a whole. Optionally, the connecting member 134 may be a metallic block. A material of the metallic block is iron, aluminum, or another alloy easily processed, for example. The metallic block may be adsorbed by a magnet to be connected to the magnet. Therefore, no additional processing is required for the connecting member 134. In other embodiments, the connecting member 134 may also not be disposed for the first adjustment member 131 that is easily processed. Instead, the threaded member 1331 is directly connected to the first adjustment member 131.

Figure 7:
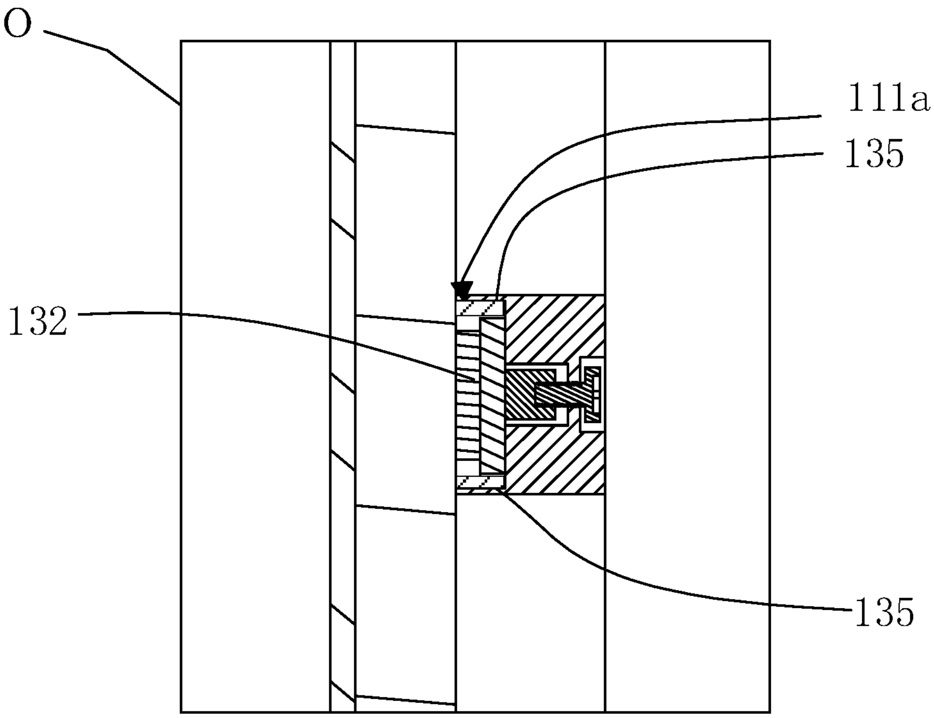
FIG. 7 is a partial enlarged diagram of a portion O of another structure of a spliced display device according to the present disclosure.

Optionally, referring to FIG. 7, a buffer layer 135 may be further disposed between the second adjustment member 132 and the sidewall of the first sub-via 111*a*. The buffer layer 135 is disposed on the sidewall of the first sub-via 111*a*. The buffer layer 135 preferably uses a flexible material. For example, the buffer layer is made of flexible resin materials, such as elastic rubber, polyimide, or acrylic resin. When an excessive external force is applied during operation, collision may occur between the second adjustment member 132 and the sidewall of the first sub-via 111*a*, and the sidewall of the first sub-via 111*a* returns a counter-acting force to the second adjustment member 132, and therefore the display screen 20 cannot be adjusted to a predetermined position, resulting in decreased adjustment precision. By means of the buffer layer 135, the above can be avoided. That is to say, by disposing the buffer layer 135 between the second adjustment member 132 and the sidewall of the first sub-via 111*a*, the adjustment precision can be increased. In addition, damage to the display screen 20 caused by collision between two display screens 20 as a result of the excessive applied external force can be avoided.

Figure 8:
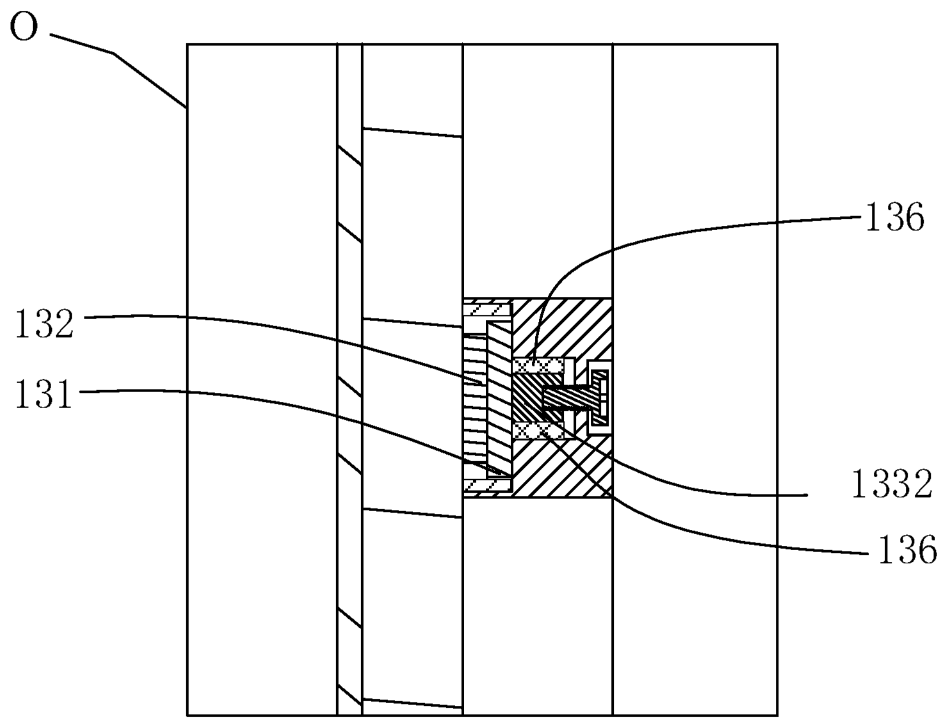
FIG. 8 is a partial enlarged diagram of a portion O of still another structure of a spliced display device according to the present disclosure.
Figure 9:
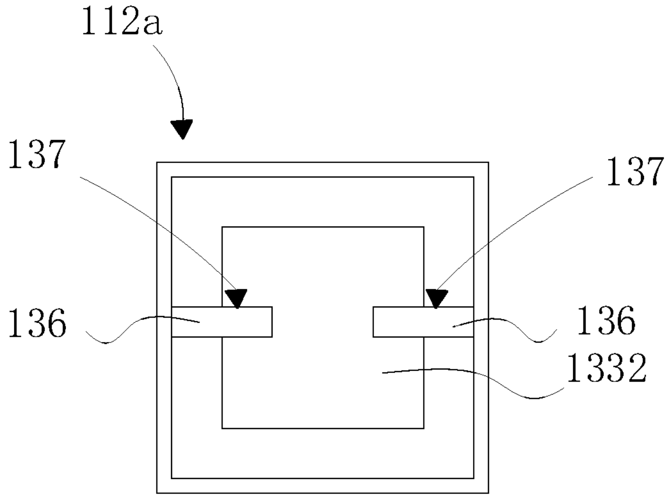
FIG. 9 is a schematic diagram showing a connection between a connecting member and a guiding rail in a second sub-via in FIG. 8.

Optionally, referring to FIGS. 8 and 9, a guiding rail 136 and a guiding groove 137 may be further formed to facilitate the movement between the connecting member 134 and the second sub-via 112*a*. In detail, the guiding rail 136 is disposed on a hole wall of the second sub-via 112*a*. The guiding rail 136 may be separately disposed on the hole wall of the second sub-via 112*a*, or may be formed using a material same as the hole wall of the second sub-via 112*a* in a same process. The guiding groove 137 is provided on a peripheral surface of the connecting member 134. The guiding rail 136 and the guiding groove 137 extend in the direction perpendicular to the plane where the carrier plate 12 is located. The guiding rail 136 is disposed in the guiding groove 137, and is movable in the guiding groove 137. By disposing the guiding rail 136 and the guiding groove 137 to facilitate the movement of the connecting member 134, the connecting member 134 can be prevented from shaking in the direction parallel to the plane where the carrier plate 12 is located, so that the adjustment precision is prevented from being affected, thereby reducing splicing seams.

An assembling method for the spliced display device of the present disclosure is as follows.

During assembling, the first adjustment member 131 is first fixed to the connecting member 134, and then is disposed at a proper position in the first sub-via 111*a* of the via 11*a*, so that the first adjustment member 131 is movable forward and backward in the first sub-via 111*a*. Then, the third adjustment member 133 is disposed in the second sub-via 112*a*, and is connected to the connecting member 134 and the limiting portion 111. A position of the third adjustment member 133 is adjusted such that the third adjustment member 133 is movable in the second sub-via 112*a* in a direction perpendicular to a plane where the substrate 11 is located. The display screen 20 is fixed to one side of the carrier plate 12. The second adjustment member 132 is mounted to an other side of the carrier plate 12. Then, the second adjustment member 132 is disposed in the first sub-via 111*a*, and is connected to the first adjustment member 131, so as to mount the display screen 20 and the carrier plate 12 to the substrate 11. It is to be noted that, the carrier plate 12 may be first disposed on a horizontal plane, and then the display screen 20 and the second adjustment member 132 may be mounted the carrier plate 12. Then, the display screen 20 and the carrier plate 12 are hung on the substrate 11 standing upright on the ground. In the present disclosure, a mounting sequence is not limited. The mounting sequence may be adjusted in a possible range by those skilled in the art.

According to the above operations, the plurality of the display screens 20 can be mounted to the display screen splicing device 10. When the plurality of the display screens 20 are disposed on the display screen splicing device 10, an assembler may determine whether splicing seams exist among the plurality of the display screens 20. When a physical splicing seam as a result of position misalignment is found between two display screens 20, the assembler may adjust the positions of the display screens 20, until the at least two display screens 20 are aligned. The positions may be adjusted manually or electrically.

Figure 10:
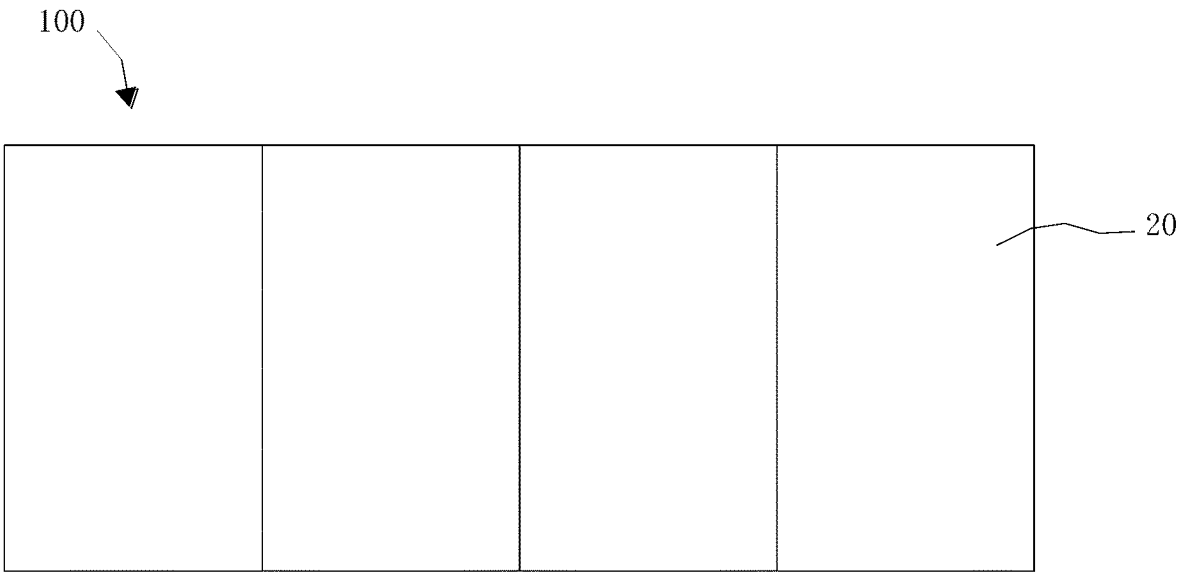
FIG. 10 is a front view of a spliced display device according to the present disclosure.

In detail, other display screens 20 may be adjusted using one display screen 20 as a reference. Description about displaying when the substrate 11 stands upright on the ground is exemplified below. It is to be understood that, in some application scenarios, the spliced display device 100 may also be disposed parallel to the ground for displaying. When a display screen 20 is not snugly attached to the reference display screen 20 in a vertical direction or a horizontal direction, the assembler may apply an acting force to the display screen 20 and the carrier plate 12, to cause the second adjustment member 132 to move in the vertical direction or the horizontal direction relative to the first adjustment member 131. When a display screen 20 is not aligned to the reference display screen 20 in the direction perpendicular to the plane where the carrier plate 12 is located, that is, in a forward/backward direction, the assembler may adjust the position of the third adjustment member 133. In detail, the assembler rotates the threaded member 1331 in a direction (for example, counterclockwise) to cause the threaded member 1331 to rotate forward in the limiting portion 111. In this way, the connecting member 134 fixedly connected to the third adjustment member 133 is driven to move forward and push the second adjustment member 132 and the first adjustment member 131 toward the carrier plate 12, thereby causing the display screen 20 to move forward. The assembler rotates the threaded member 1331 in a reverse direction (for example, clockwise), so that the threaded member 1331 is rotated backward in the limiting portion 111. In this way, the connecting member 134 fixedly connected to the third adjustment member 133 is driven to move backward and push the second adjustment member 132 and the first adjustment member 131 toward the substrate 11, thereby causing the display screen 20 to move backward. By means of the operations, the display screen splicing device 10 of the present disclosure can splice the display screens 20 seamlessly, thereby obtaining a spliced display device 100 without splicing seams, as shown in FIG. 10.

The present disclosure provides a display screen splicing device and a spliced display device. According to the display screen splicing device of the present disclosure, the first adjustment member and the second adjustment member are disposed between the substrate and the carrier plates. When the display screen is disposed on the carrier plate, the second adjustment member is caused to move relative to the first adjustment member in the direction parallel to the plane where the carrier plate is located, so that the carrier plate and the display screen can be driven to move, thereby adjusting positions of the plurality of display screens. In this way, physical splicing seams among the plurality of display screens are reduced or even eliminated, thereby obtaining a spliced display device has smaller splicing seams or a seamless spliced display device.

According to an implementation of the present disclosure, the third adjustment member movable in the direction perpendicular to the plane where the carrier plate is located is disposed. By adjusting the third adjustment member, the position of the display screen disposed on the display screen splicing device in the direction perpendicular to the plane where the carrier plate is located can be adjusted, thereby reducing or even eliminating the physical splicing seams among the plurality of display screens.

The implementations of the present disclosure are described in detail above. The principles and implementations of the present disclosure are described through specific examples in this specification, and the descriptions of the foregoing implementations are merely intended to help understand the present disclosure. Meanwhile, a person skilled in the art may make modifications to the specific implementations and application scopes according to the ideas of the present disclosure. In conclusion, the content of this specification should not be construed as a limitation to the present disclosure.

What is claimed is:

1. A display screen splicing device, comprising:

a substrate;

at least two carrier plates, each disposed on the substrate and configured to carry a display screen;

a position adjustment assembly connected between the substrate and the carrier plates, wherein the position adjustment assembly comprises a first adjustment member and a second adjustment member, the first adjustment member is disposed on the substrate, the second adjustment member is movably connected to the first adjustment member and is fixedly connected to the carrier plates, and a movement track of the second adjustment member is parallel to a plane where the carrier plates are located;

wherein a via is provided on the substrate, the via comprises a first sub-via, the first adjustment member is disposed in the first sub-via, at least part of the second adjustment member is disposed in the first sub-via, and a movement gap is retained between the second adjustment member and a sidewall of the first sub-via; and wherein a buffer layer is disposed on the sidewall of the first sub-via.

2. The display screen splicing device as claimed in claim 1, wherein the first adjustment member and the second adjustment member both are magnets.

3. The display screen splicing device as claimed in claim 1, wherein the position adjustment assembly further comprises a third adjustment member, the third adjustment member is fixedly connected to an end of the first adjustment member away from the second adjustment member, the via comprises a second sub-via, the second sub-via communicates with the first sub-via, the third adjustment member is disposed in the second sub-via, and a movement track of the third adjustment member is perpendicular to the plane where the carrier plates are located.

4. The display screen splicing device as claimed in claim 3, wherein a limiting portion is disposed in the second sub-via, a threaded hole is provided in the limiting portion, the third adjustment member comprises a threaded member, and the threaded member is threaded through the threaded hole and is threadedly connected to the threaded hole.

5. The display screen splicing device as claimed in claim 4, wherein the third adjustment member further comprises a connecting member, an end portion of the threaded member is fixedly connected to the connecting member, and the first adjustment member is fixedly connected to an end of the connecting member away from the threaded member.

6. The display screen splicing device as claimed in claim 5, wherein the connecting member is disposed in the second sub-via, a guiding rail is disposed on a hole wall of the second sub-via, a guiding groove is provided on a peripheral surface of the connecting member, and the guiding rail is disposed in the guiding groove.

7. The display screen splicing device as claimed in claim 5, wherein the connecting member is a metallic block.

8. A spliced display device, comprising the display screen splicing device and the display screen as claimed in claim 1, wherein the display screen is disposed on sides of the carrier plates that are away from the substrate.

9. The spliced display device as claimed in claim 1, wherein the first adjustment member and the second adjustment member both are a magnets.

10. The spliced display device as claimed in claim 8, wherein the position adjustment assembly further comprises a third adjustment member, the third adjustment member is fixedly connected to an end of the first adjustment member away from the second adjustment member, the via comprises a second sub-via, the second sub-via communicates with the first sub-via, the third adjustment member is disposed in the second sub-via, and a movement track of the third adjustment member is perpendicular to the plane where the carrier plates are located.

11. The spliced display device as claimed in claim 10, wherein a limiting portion is disposed in the second sub-via, a threaded hole is provided in the limiting portion, the third adjustment member comprises a threaded member, and the threaded member is threaded through the threaded hole and is threadedly connected to the threaded hole.

12. The spliced display device as claimed in claim 11, wherein the third adjustment member further comprises a connecting member, an end portion of the threaded member is fixedly connected to the connecting member, and the first adjustment member is fixedly connected to an end of the connecting member away from the threaded member.

13. The spliced display device as claimed in claim 12, wherein the connecting member is disposed in the second sub-via, a guiding rail is disposed on a hole wall of the second sub-via, a guiding groove is provided on a peripheral surface of the connecting member, and the guiding rail is disposed in the guiding groove.

14. The spliced display device as claimed in claim 12, wherein the connecting member is a metallic block.

15. A display screen splicing device, comprising:

a substrate;

at least two carrier plates, each disposed on the substrate and configured to carry a display screen;

a position adjustment assembly, connected between the substrate and the carrier plates, wherein the position adjustment assembly comprises a first adjustment member, a second adjustment member, and a third adjustment member, the first adjustment member is disposed on the substrate, the second adjustment member is movably connected to the first adjustment member and is fixedly connected to the carrier plates, a movement track of the second adjustment member is parallel to a plane where the carrier plates are located, the third adjustment member is fixedly connected to an end of the first adjustment member that is away from the second adjustment member, and a movement track of the third adjustment member is perpendicular to the plane where the carrier plates are located;

wherein a via is provided on the substrate, the via comprises a first sub-via, the first adjustment member is disposed in the first sub-via, at least part of the second adjustment member is disposed in the first sub-via, and a movement gap is retained between the second adjustment member and a sidewall of the first sub-via; and wherein a buffer layer is disposed on the sidewall of the first sub-via.

16. The display screen splicing device as claimed in claim 15, wherein the first adjustment member and the second adjustment member both are a magnets.

* * * * *